US009255799B2

(12) United States Patent
Landers et al.

(10) Patent No.: US 9,255,799 B2
(45) Date of Patent: Feb. 9, 2016

(54) DETERMINING AND CORRECTING ERROR OF POSITIONAL VECTOR-VALUED SENSORS USING A FIXED ANGLE CALIBRATION PROCESS

(71) Applicant: YEI Corporation, Portsmouth, OH (US)

(72) Inventors: Stephen P. Landers, Wheelersburg, OH (US); Paul Yost, Portsmouth, OH (US)

(73) Assignee: YOST LABS INC., Portsmouth, OH (US)

( * ) Notice: Subject to any disclaimer, the term of this patent is extended or adjusted under 35 U.S.C. 154(b) by 0 days.

(21) Appl. No.: 13/926,145

(22) Filed: Jun. 25, 2013

(65) Prior Publication Data

US 2013/0338955 A1    Dec. 19, 2013

Related U.S. Application Data

(63) Continuation of application No. PCT/US2013/045910, filed on Jun. 14, 2013.

(60) Provisional application No. 61/659,551, filed on Jun. 14, 2012.

(51) Int. Cl.
*G01C 17/38* (2006.01)
*G01D 18/00* (2006.01)
(Continued)

(52) U.S. Cl.
CPC .............. *G01C 17/38* (2013.01); *G01C 25/005* (2013.01); *G01D 18/002* (2013.01); *G01D 18/008* (2013.01); *G01P 21/00* (2013.01)

(58) Field of Classification Search
CPC ........ G01C 17/38; G01C 15/00; G01C 21/16; G01C 25/00; G01C 25/005; G01D 18/008; G01D 3/08; G01D 9/00; G01N 121/274; G01R 35/005; G01P 5/18; G01P 15/18; G01F 3/001; A63B 2220/40; B25J 9/1692
See application file for complete search history.

(56) References Cited

U.S. PATENT DOCUMENTS 7,719,261 B2    5/2010   Geek et al.
2003/0158694 A1   8/2003   Wegerich
(Continued)

FOREIGN PATENT DOCUMENTS

JP    2010112871 A    5/2010
JP    2011047881 A    3/2011
(Continued)

OTHER PUBLICATIONS

ArcGIS 9.2 Webhelp Topic, How Inverse Distance Weighted (IDW) interpolation works, Aug. 7, 2007, pp. 1-4.*
International Search Report & Written Opinion relating to PCT/US2013/045910; Mail Date Sep. 2, 2013.
(Continued)

*Primary Examiner* — Janet Suglo
*Assistant Examiner* — L. Anderson
(74) *Attorney, Agent, or Firm* — Edell, Shapiro & Finnan, LLC

(57) ABSTRACT

Systems and methods described herein relate to the correction of positional vector-valued sensors using a variety of calibration processes including fixed-angle calibration, known-angle calibration, ortho-calibration and 3-axis gimbal calibration further including various weighting schemes to provide fine-tuned functions or interpolated data which may be used for real-time sensor correction calculation or to populate a look-up table of corrected values.

17 Claims, 9 Drawing Sheets

(51) Int. Cl.
*G01P 21/00* (2006.01)
*G01C 25/00* (2006.01)

(56) References Cited

U.S. PATENT DOCUMENTS

2010/0218588 A1* 9/2010 Staniewicz et al. ............ 73/1.75
2012/0265470 A1 10/2012 Yost

FOREIGN PATENT DOCUMENTS

KR         100876561 B1   12/2008
WO    WO2008/122904 A2   10/2008

OTHER PUBLICATIONS

Ivan Stojmenovic, Chapter 7: Time Synchronization and Calibration in Wireless Sensor Networks, Handbook of Sensor Networks Algorithms and Architectures, 2005, pp. 199-237, John Wiley & Sons, Inc.
Dot Product, retrieved Jun. 11, 2013, http://www.mathisisfun.com/algebra/vectors-dot-product.html.
Importance of Industrial Grade Sensor Calibration, Calibration, retrieved Jun. 11, 2013, http://www.vectornav.com/support/library?id=86.
International Preliminary Report on Patentability cited in corresponding PCT Application No. PCT/US2013/014910, dated Dec. 24, 2014.

* cited by examiner

DETERMINING AND CORRECTING ERROR OF POSITIONAL VECTOR-VALUED SENSORS USING A FIXED ANGLE CALIBRATION PROCESS

RELATED APPLICATION

This application is a continuation of PCT international Application No. PCT/US2013/45910 filed Jun. 14, 2013, which claims the benefit of U.S. Provisional Application No. 61/659,551, filed Jun. 14, 2012, which applications are hereby incorporated by reference in their entirety.

BACKGROUND

1. Field

The present specification generally relates to sensor calibration.

2. Technical Background

Many systems incorporate vector-valued sensors to measure directional physical quantities. Such sensors include multi-axis magnetometers, multi-axis accelerometers, sonar arrays, radar arrays, etc. These sensors are subject to inaccuracies resulting from both internal and external sources.

Systems often make use of multi-axis or vector-valued sensors to measure physical quantities. Since the position of the sensor relative to the physical quantity being measured determines the sensor output vector, it can be considered a positional vector-valued sensor. Thus, positional vector-valued sensors are a class of sensor which has a relationship between relative sensor orientation and source orientation that produce a vector output. FIG. 1A illustrates a vector-valued sensor. The sensor, in orientation (101), senses physical quantity (102). This yields a sensor reading (103) that is relative to the body of the sensor. Similarly, the sensor, when placed in another orientation (111), senses the same physical quantity (102), and this time yields sensor reading (113) as shown in FIG. 1B. These sensors can exhibit inaccuracies stemming from a variety of sources. Sources of sensor inaccuracy may include internal sensor error sources such as sensor scale and bias effects, non-linear sensor output, asymmetric sensor output, sensor non-orthogonality, and sensor cross-axis effect or external error sources such as distortion or attenuation of the physical quantity being measured. For example, a multi-axis magnetometer may exhibit inaccuracies from imperfections in the sensor itself (scale/bias, sensor non-linearity, cross-axis effect, etc.) as well as from magnetic field distortion due to soft-iron effects of nearby ferrous system components or hard-iron effects of nearby magnetic sources such as motors, speakers, or current carrying conductors.

Traditionally, error in vector-valued sensors is accounted for in two ways. First, one might carefully design and place the sensor within the system to minimize or shield the sensor from external error sources. Second, one might account for internal sensor error sources by treating the system as a whole and using computational transformations such scaling, translating, skewing, and rotating the sensor output vectors to minimize error. These methods, however, can vary in effectiveness because the removal of external disturbances is sometimes not feasible (for example, if a system needs a battery to be near the magnetometer due to space constraints). Alternatively, sensors with non-linear, asymmetric, or jagged response properties cannot be effectively corrected using simple transformations of the data as a whole. In particular, magnetometers can exhibit errors of this form when there are a variety of objects nearby which can cause magnetic disturbances, as is often unavoidable in small electronic circuits. Sensors can also exhibit these effects due to imperfections in the manufacturing and assembling of their components. Because simple transformations affect all the data evenly, they are unable to account for any errors that only show up in a portion of the data. Other systems/method for solving sensor error are provided in U.S. patent application Ser. No. 13/478,757: Sensor Devices Utilizing Look-Up Tables for Error Correction and Methods Thereof, assigned to Yost Engineering, Inc. and hereby incorporated by reference, but even greater accuracy is desired.

Therefore, there is a need in the art to provide a better system/method of correcting error of positional vector-valued sensors, particularly in cases in which the error can not be canceled out and exhibits non-linear, asymmetric, or jagged properties.

SUMMARY

Aspects and embodiments of the systems comprise varying depth and breadth in their functionality. In the alternative, the systems disclosed herein could be translated into computer machine implemented methodologies and computer-executable instructions encoded on a computer-readable medium for execution on a computer machine.

In an aspect, a sensor calibration system comprises a vector-value sensor and a special-purpose computer machine configured to automatically calculate a set of vector corrections in response to receiving, as computer input, a set of sensed vectors from said vector-value sensor. The computer machine is further configured to calculate a final correction vector by, in response to placing said vector-value sensor in a prime orientation, recording, in a computer memory, a prime sensed vector. The computer machine is further configured to record, in response to rotating said vector-value sensor a first known angle away from said prime orientation, in said computer memory, a first sensed vector. The computer machine is further configured to record, in response to rotating said vector-value sensor a second known angle away from said prime orientation, in said computer memory, a second sensed vector. The computer machine is configured to record, in response to rotating said vector-value sensor through "n" known angles away from said prime orientation, in said computer memory, through "n" sensed vector(s).

In embodiments disclosed herein, the computer machine calculates a set of calculated vectors by calculating a first calculated vector by rotating the prime sensed vector by said first known angle away from said prime orientation; calculating a second calculated vector by rotating the prime sensed vector by said second known angle away from said prime orientation; calculating through "n" calculated vector(s) by rotating the prime sensed vector by each of said "n" known angle(s) away from said prime orientation.

In embodiments disclosed herein, said computer machine calculates a set of first, second, through "n" vector corrections ($cv_i$) by subtracting said first sensed vector from said first calculated vector; said second sensed vector from said second calculated vector; each of said "n" sensed vectors from each of said "n" calculated vector(s). The computer machine calculates said final correction vector, for an input vector from said vector-valued sensor, using said set of vector corrections.

In embodiments disclosed herein, the final correction vector is calculated by further weighting an average of said set of first, second, through "n" vector corrections wherein a proximity value more heavily weights vectors more proximate to said input vector than less proximate vectors.

In embodiments disclosed herein, for each sensed vector ($s_i$) a weight ($w_i$) is calculated using the formula: $w_i=((v*s_i)+1)^p$ and further wherein v represents said input vector and p adjusts how closely said final correction vector should be affected by a set of nearby vectors.

In embodiments disclosed herein, p equals 20.

In embodiments disclosed herein, each of said weights ($w_i$) is summed into weight$_{total}$; each of said weights ($w_i$) is divided by weight and said final correction vector ($cv_{final}$) is calculated using a $cv_{final}$ formula comprising $cv_{final}=\Sigma cv_i*w_i$.

In embodiments disclosed herein, the computer machine calculates said final corrected vector using a set of interpolated vector corrections from a computer memory.

In embodiments disclosed herein, the weighted average of said set of first, second, through "n" vector corrections is performed using a distance-based weighting formula.

In embodiments disclosed herein, a sensor calibration system further comprises a ratchet platform which rotates said vector-value sensor.

In embodiments disclosed herein, a sensor calibration system further comprises a 3-axis gimbal which samples and records data from said vector-value sensor and said gimbal's orientation.

In embodiments disclosed herein, a sensor calibration system as claimed in claim 1 is further configured to calculate said final correction vector for said input vector by calculating a weighted average of said set of first, second, through "n" vector corrections, wherein a proximity value weights more proximate vectors more heavily than less proximate vectors.

In embodiments disclosed herein each of said known angles divides into 360 evenly.

In embodiments disclosed herein said sensor calibration system further comprises a bracket, wherein, for each rotation of said vector-value sensor, said vector-value sensor is placed in said bracket designed to provide consistent angle rotation.

In embodiments disclosed herein said vector-value sensor comprises six faces and said final correction vector for said input vector is calculated by: recording said set of sensed vectors for each of said six faces wherein each of said sensed vectors is recorded in response to rotating said vector-value sensor about each of said six faces' normal and further wherein each of said six faces are similarly situated for gathering said set of sensed vectors; and calculating said set of calculated vectors for each of said six faces; and calculating said final correction vector for a given vector by calculating a weighted average of said set of first, second, through "n" vector corrections for each of said six faces wherein a proximity value weights more proximate vectors more heavily than less proximate vectors.

In embodiments disclosed herein, a plurality of final correction vectors are interpolated from a plurality of angles and stored in a computer memory and wherein said computer machine accesses said computer memory to retrieve a final correction vector in response to receiving as computer input said input vector from said vector-value sensor.

In another aspect, a sensor calibration system comprises a vector-value sensor selected from the group consisting of a magnetometer and an accelerometer. It also includes a special purpose computer machine configured to automatically calculate a final correction vector for an input vector by, in response to placing said vector-value sensor in a prime orientation, recording a prime sensed vector; in response to rotating said vector-value sensor a first known angle away from said prime orientation, recording, in computer memory, a first sensed vector; in response to rotating said vector-value sensor a second known angle away from said prime orientation, recording, in computer memory, a second sensed vector; in response to rotating said vector-value sensor through "n" known angle(s) away from said prime orientation, recording, in computer memory, through an "n" sensed vector. The computer machine calculates a set of calculated vectors by calculating a first calculated vector by rotating the prime sensed vector by said first known angle away from said prime orientation; calculating a second calculated vector by rotating the prime sensed vector by said second known angle away from said prime orientation; and calculating through "n" calculated vector(s) by rotating the prime sensed vector by each of said "n" known angle(s) away from said prime orientation. The computer machine calculates a set of first, second through "n" vector corrections ($cv_i$) by subtracting each of said first, second through "n" sensed vectors from each of said calculated vectors where said sensed vectors and said calculated vectors share said known angle. The computer machine calculates the final correction vector for said input vector by taking a weighted average of said set of first, second, through "n" vector corrections wherein a proximity value (p) weights more proximate vectors more heavily than less proximate vectors, and for each sensed vector ($s_i$) a weight ($w_i$) is calculated in relation to said input vector (v) using the formula: $w_i=((v*s_i)+1)^p$, and each of said weights calculated is summed into weight$_{total}$, each of said weights ($w_i$) is divided by weight$_{total}$; and said final correction vector ($cv_{final}$) is calculated by a $cv_{final}$ formula comprising: $cv_{final}=\Sigma cv_i*w_i$.

In embodiments disclosed herein, the computer machine interpolates a set of final correction vectors for a plurality of vectors and stores said final correction vectors in a computer memory.

In embodiments disclosed herein, a sensor correction system comprising a computer machine further comprises computer-executable instructions to receive an input vector reading from a vector-value sensor; access a computer memory comprising a set of interpolated final correction vectors for a plurality of vector readings; select an applicable final correction vector; and return said final correction vector as computer machine output.

In embodiments disclosed herein, said set of interpolated final correction vectors are determined from a set of sensed vectors, in response to rotating said vector-value sensor through at least "n" known angles, and a set of calculated vectors, in response to rotating a prime sensed vector through said "n" known angles away from a prime orientation and wherein said sensed vectors and said calculated vectors are subtracted from one another, weighted, and normalized.

In embodiments disclosed herein, a given final correction vector is calculated using a $cv_{final}$ formula comprising: $cv_{final}=\Sigma cv_i*w_i$ wherein $cv_{final}$ is said final correction vector, $cv_i$ represents a correction vector associated with each angle rotation, and $w_i$, represents a normalized weight factor.

In embodiments disclosed herein, a proximity value weights more proximate vectors more heavily than less proximate vectors.

It should also be understood that various aspects, embodiments and features may be combined or substituted without departing from the ambit of the disclosure provided herein.

BRIEF DESCRIPTION OF THE DRAWINGS

The following detailed description of the illustrative aspects and embodiments can be understood when read in conjunction with the following drawings, where like structure is indicated with like reference numerals and in which.

DETAILED DESCRIPTION

Figure 1B:
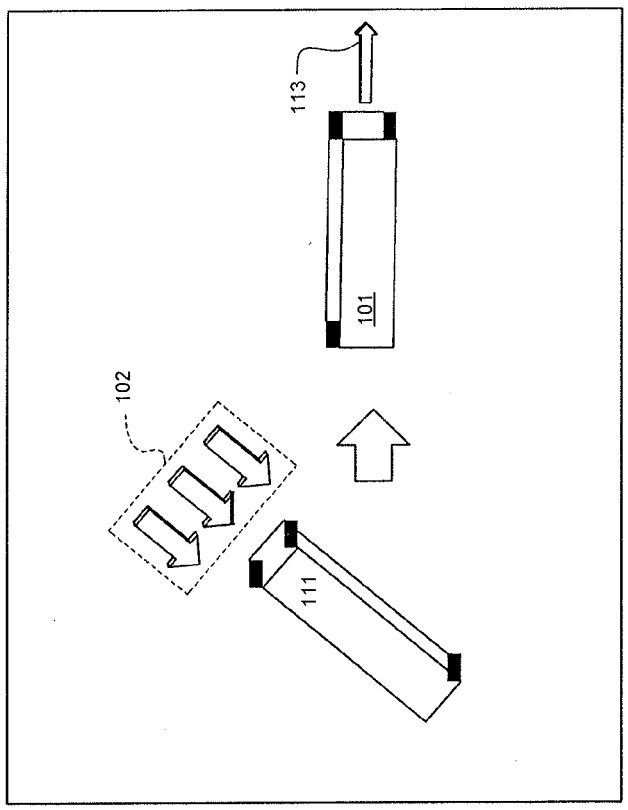
FIG. 1B depicts an example of a sensor device in a second orientation and producing a second sensor reading.
Figure 1A:
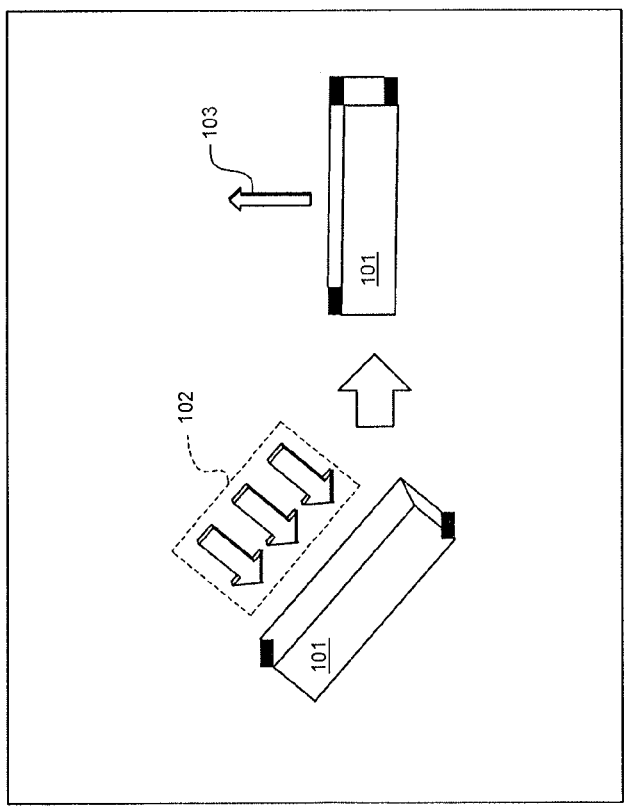
FIG. 1A depicts an example of a sensor device in a first orientation and producing a first sensor reading.

The drawings, systems and methods described herein relate to the correction of positional vector-valued sensors using a fixed angle calibration process.

GENERAL DEFINITIONS

"Automatically" means the use of a machine to conduct a particular action. For instance, processes by which data is extracted, organized and stored is a an automatic process and may utilize a computer network (e.g., wide area network, such as the internet, a local area network, a mobile communications network, a public service telephone network, and/or any other network and may be configured to electronically connect a user computing device (e.g., a PC) and a server computing device (e.g., cloud, mainframe, or other server device).

"Calculate" means determining or ascertaining a result or computer machine output using computer machine input.

"Calibration System" means, for at least one embodiment disclosed herein, a combination of a "Communications Medium" includes both wired and wireless modes of electronic communication including but not limited to digital, analog, and other such forms of communication known in the art.

"Computer Machine" means a machine (e.g., desktop, laptop, tablet, smartphone, television, server, as well as other current or future computer machine instantiations) containing a computer processor that has been specially configured, to create a special purpose computer machine, with a set of computer executable instructions to automatically perform the set of computer executable instructions (a computer machine may also be deployed within other machines such as a magnetometer or accelerometer). References to "a first", "one" or "at least one" computer machine are intended to encompass both autonomous systems and sub-systems as well as situations where a given functionality might be divided across multiple machines (e.g. parallel processing) for efficiency or other purposes.

"Computer Machine Input/Output" means input/output received/produced by a computer machine.

"Exemplary" means giving an example; serving as a non-limiting illustration or example of something.

"Computer Memory," for at least one embodiment described herein, is non-volatile, non-transitory computer storage comprising RAM, ROM, a flash memory, a hard drive, or any device capable of storing machine readable instructions and/or data.

"Network Interface Hardware" may include any wired/wireless hardware generally known to those of skill in the art for communicating with other networks and/or devices.

A "Processor" means any processing component configured to receive and execute instructions (such as from the data storage component and/or computer memory component) and may include a controller, an integrated circuit, a microchip, a computer, or any other computing device. References to first and second processors may reside in different specially coded computer machines or may be a single computer machine that is specially encoded with different computer executable instructions stored on the same processor. References to first and second processors within a given configuration are for purposes of convenience and not intended to be limiting as various configurations are possible and would be known to one of skill in the art.

A "Server" means a customized computer machine or a general purpose computer machine with the requisite hardware, software, and/or firmware. A server may include a processor, input/output hardware, network interface hardware, a data storage component (which stores data and/or metadata) and a memory component configured as volatile or non-volatile memory including RAM (e.g., SRAM, DRAM, and/or other types of random access memory), flash memory, registers, compact discs (CDs), digital versatile discs (DVD), and/or other types of storage components. A memory component may also include operating logic that, when executed, facilitates the operations described herein.

ADDITIONAL DEFINITIONS

An "Accelerometer" means a device that measures proper acceleration.

An "Array" is a non-volatile block of computer memory for storing a number of items.

"Euler Angles" may be a means of representing the spatial orientation of any reference frame (coordinate system or basis) as a composition of three elemental rotations starting from a known standard orientation, represented by another frame (sometimes referred to as the original or fixed reference frame, or standard basis).

"Final Correction Vector" means, in at least one embodiment disclosed herein, a correction to be applied to a live sensor reading based on a weighted interpolation of readings obtained from said sensor in a non-deployed environment.

"Gimbals" means, in at least one embodiment disclosed herein, a contrivance, consisting of a ring or base on an axis, that permits an object, as in a ship's compass, mounted in or on it to tilt freely in any direction, in effect suspending the object so that it will remain horizontal even when its support is tipped.

"Interpolate" means, in at least one embodiment disclosed herein, the process of approximating a given function or additional values by using values at a discrete set of points.

"Live Sensed Vector" or "Live Sensor Reading" means, in at least one embodiment disclosed herein, a reading from a sensor deployed in a live (as opposed to test) environment.

A "Magnetometer" means, in at least one embodiment disclosed herein, a measuring instrument used to measure the strength and, in some cases, the direction of magnetic fields.

"N" as used herein includes three or more.

"Normal" means, in at least one embodiment disclosed herein, the vector which points directly out from the face.

A "Sensor" means, in at least one embodiment disclosed herein, a mechanical device sensitive to a characteristic (e.g., magnetism, acceleration) that transmits a signal to a measuring or control instrument.

A "Sonar Array" means, in at least one embodiment disclosed herein, an arrangement of several sonar transducers or sonar projectors, appropriately spaced and energized to give proper directional characteristics.

A "Transducer" means, in at least one embodiment disclosed herein, a device that converts a signal in one form of energy to another form of energy.

With these definitions established, the structure and operation of various embodiments of systems and methods for calibrating sensors are now described.

The invention presented herein has the ability to account for errors that are non-linear, asymmetric, or jagged, unlike usual methods for fixing sensor error. In fact, this invention can correct for any kind of repeatable positional vector-valued sensor error. In other words, so long as the average value of a sensor in a given orientation is the same every time regardless of other factors like time, temperature, or previously taken actions, the sensor's error in that orientation may be corrected.

Exemplary Deployment

Figure 9:
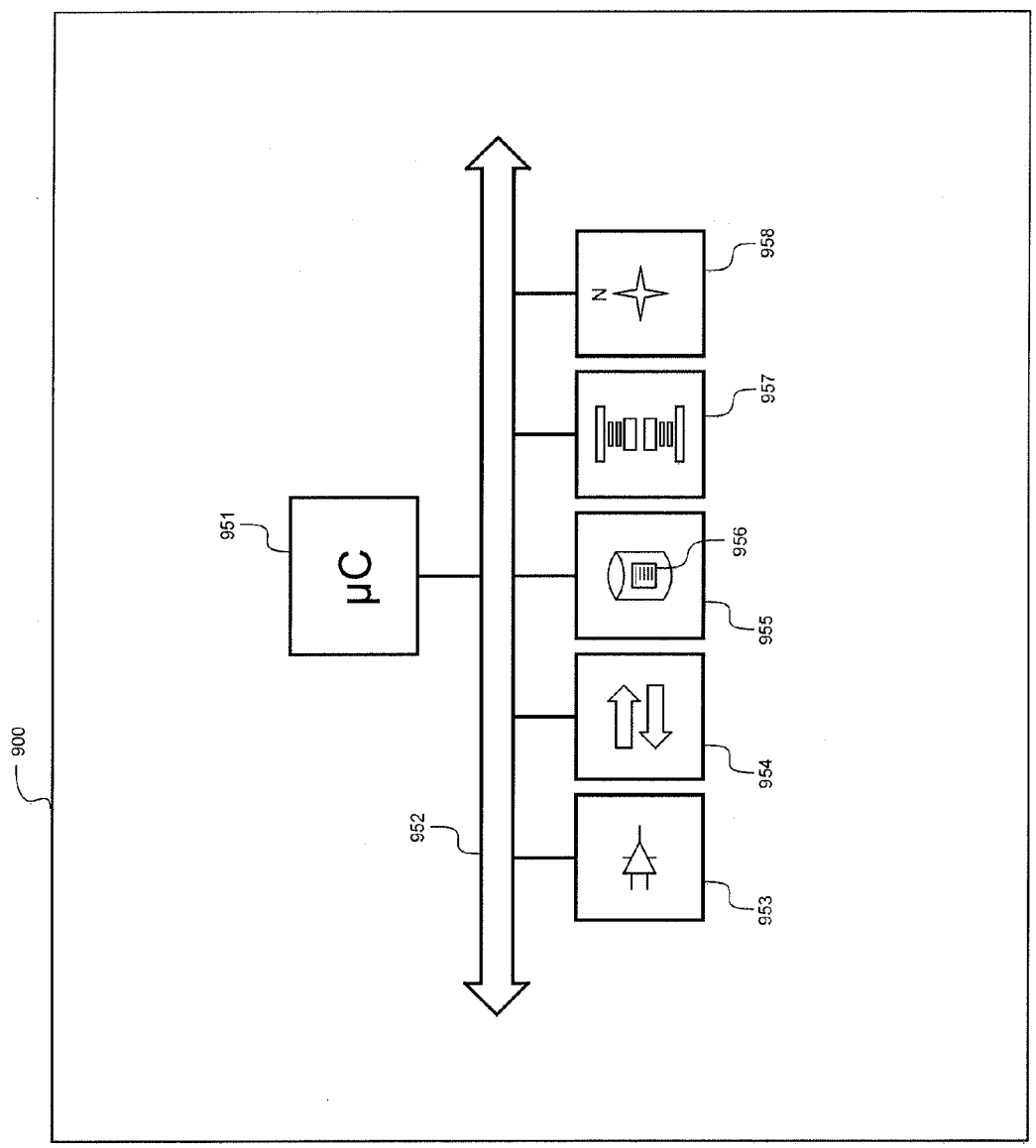
FIG. 9 represents an exemplary architecture for sensor deployment.

FIG. 9 depicts an exemplary architecture deploying a sensor device (900) for estimating an orientation of the sensor device (900) (and/or the orientation of an object or device incorporating the sensor device 900) embodied as hardware, software, and/or firmware, according to embodiments shown and described herein. It is noted that computer-program products and methods for correcting the output of the sensor device (900) may be executed by any combination of hardware, software, and/or firmware to configure a general purpose computer machine into a special purpose computer machine.

The sensor device (900) illustrated in FIG. 9 may comprise a controller (951), additional controller hardware (953), input/output hardware (954), computer usable medium (955) (which may store computer readable code (956) for performing the various operations for orientation estimations, for example), a first physical sensor (957), and a second physical sensor (958). In the illustrated embodiment, a first physical sensor (957) may be an accelerometer and the second physical sensor (958) may be a magnetometer or compass. More or fewer sensors may be utilized. For example, a sensor device (900) may include only one sensor. It should be understood that the components illustrated in FIG. 9 are merely exemplary and are not intended to limit the scope of this disclosure.

A computer useable medium (955) may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the computer useable medium (955) may be configured to store, among other things, computer readable code (956), one or more look-up tables, and associated corrective data for correcting the sensor vector outputs for the one or more sensors (957), (958), as described in more detail below. It should be understood that the computer useable medium (955) may also store one additional data for access by the controller (951) and/or additional controller hardware (953). A local interface (952) is also included in the embodiment of FIG. 9, and may be implemented as a bus or other interface to facilitate communication among the components of the sensor device (900).

A controller (951) may include any processing component configured to receive and execute instructions (such as from the computer useable medium 955). Correction methods described herein may be effectuated by the controller as software instructions stored on the computer useable medium (955), as well as by additional controller hardware (953). In some embodiments, the additional controller hardware (953) may comprise logic gates to perform the software instructions as a hardware implementation. The controller (951) may be configured as, but not limited to, a general purpose microcontroller, an application-specific integrated circuit, or a programmable logic controller.

The sensor device 900 may be incorporated into larger systems, and may be able to communicate with external devices and components of such systems via input/output hardware 954. The input/output hardware 954 may include any hardware and/or software for sending and receiving data, such as an output signal corresponding to an orientation estimation of the sensor device 900. Exemplary input/output hardware 954 includes, but is not limited to, universal serial bus (USB), FireWire, Thunderbolt, local area network (LAN) port, wireless fidelity (Wi-Fi) card, WiMax card, and/or other hardware for communicating with other networks and/or external devices.

As described in more detail below, the first and second physical sensors (957, 958) may be configured to provide a signal to the controller (951) (or other components of the sensor device (900)) as a sensor vector that corresponds with a physical orientation of the sensor device (900). The signal or data from the first and/or second physical sensors (957, 958) may be provided to the controller (951) and/or additional controller hardware (953) over the local interface (952). For example, the accelerometer may be configured to provide a sensor vector that corresponds to its orientation relative to gravity, while the magnetometer may be configured to provide a sensor vector that corresponds to its orientation relative to magnetic North. The accelerometer and the magnetometer may be configured as any proprietary, currently available, or yet-to-be-developed sensor. It should be understood that the sensor device (900) may have any combination of accelerometers and magnetometers (or other sensors that output a sensor vector corresponding to orientation).

Known-Angle Calibration Scheme

A sensor may be placed in an initial orientation also known as "prime orientation". This orientation can be any orientation. The sensor may then be rotated by some known angle away from the prime orientation expressed in terms of 3d Euler angles, listed in the form:

$$e_i = (e_a, e_b, e_c) e_i = (e_a, e_b, e_c)$$

These angles represent the pitch, yaw, and roll of the rotation. It should be noted, however, that the number of possible angle rotations is not necessarily limited to three angles in this aspect or any other aspect/embodiment disclosed herein.

For each orientation the sensor is placed in, the sensed vector $s_i$ read from the sensor may be recorded. A calculated vector $c_i$ may also be recorded indicating what the sensor should have read in this orientation. $c_i$ is obtained by rotating the sensed vector from the prime orientation $s_0$ by $e_i$. $s_i$ and $c_i$ are both normalized to be of unit length. A vector correction $cv_i$ for each orientation is calculated as $cv_i = c_i - s_i$. Calculated vectors may be calculated in a separate process or as sensed vectors are obtained.

Fixed-Angle Calibration Scheme

Figure 2:
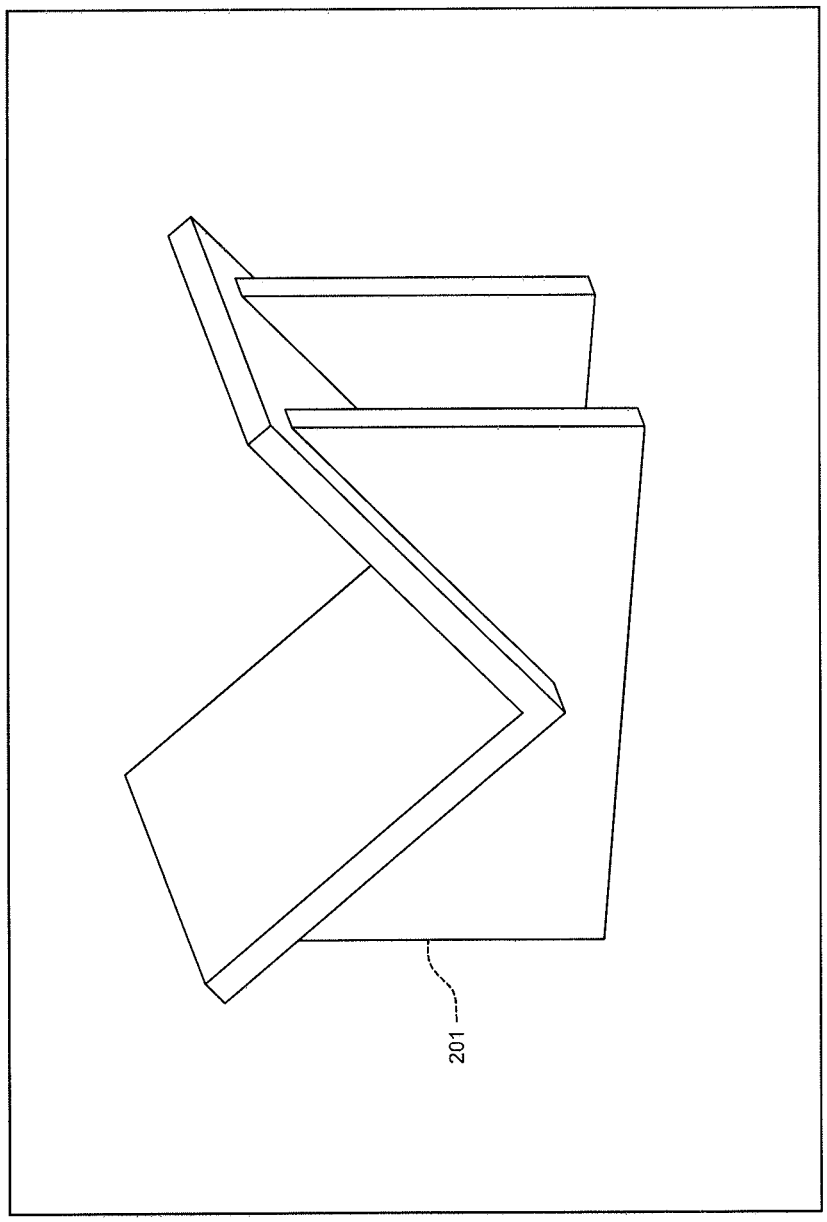
FIG. 2 depicts an exemplary configuration using a bracket for positioning a sensor device.

A fixed-angle calibration scheme can be used to approximate sensor error. The scheme may be identical or substantially similar to the known-angle scheme, with the exception that instead of using any arbitrary set of angles $e_i$ the sensor may be rotated by every unique Euler angle:

$$e_i = (a*n, a*m, a*p)$$

from the prime orientation, where a is any angle, and n, m, and p are any integer. A preferred embodiment utilizes angles that divide 360 evenly (e.g. 120, 90, 60, 45, 30). A subset of these angles may also be used. Referring to FIG. 2, an exemplary bracket (201) may be utilized to accommodate placement in each of the needed orientations.

Fixed-Angle Vector Spread

The obtained correction data may be best when the set of calculated vectors is as spread out as possible. This occurs when the prime orientation puts the sensor in an orientation where the closest of its axes to the physical quantity it is trying to sense is a/2 degrees away from being parallel to this physical quantity. For example, if a=90 and the sensor in question was an accelerometer, it may be preferred to have the prime orientation be one where the sensor is sitting on a 45 degree slope. It should be noted that this process can also be applied to several vector-valued sensors at once (for example, both a compass and accelerometer). In this case the way to get the best calculated vector spread is to set the sensor at an angle that gets it as close as possible to all the desired angles as possible.

Ortho-Calibration

A variation of the fixed-angle method may be called ortho-calibration, where a=90. There are 24 unique orientations in this case of the method requiring low storage/computer memory. Also, this particular case of the method may be carried out very easily as a simple slope can be made out of any available materials (such as a propped up book) and pushed up against a wall, allowing for easy placement of the sensor in the 24 necessary orientations. Referring again to FIG. 2, variations on an exemplary bracket (201) may be utilized for this method. This data can then be stored in computer memory on a computer and used with a weighting scheme in order to correct vector valued data. This data can also be used to fill in a lookup table stored in a computer memory such as the lookup table as described in US Patent Application Publication No. 2012/0265470 entitled Sensor Devices Utilizing Look-Up Tables for Error Correction and Methods Thereof. Because the data can be interpolated, even the case in which there is minimal data collected by the fixed-angle method, as will be the case when the fixed-angle is 90 degrees, a lookup table of any resolution can be filled with data.

Fixed-Angle Calibration with a Ratchet Table

Figure 5:
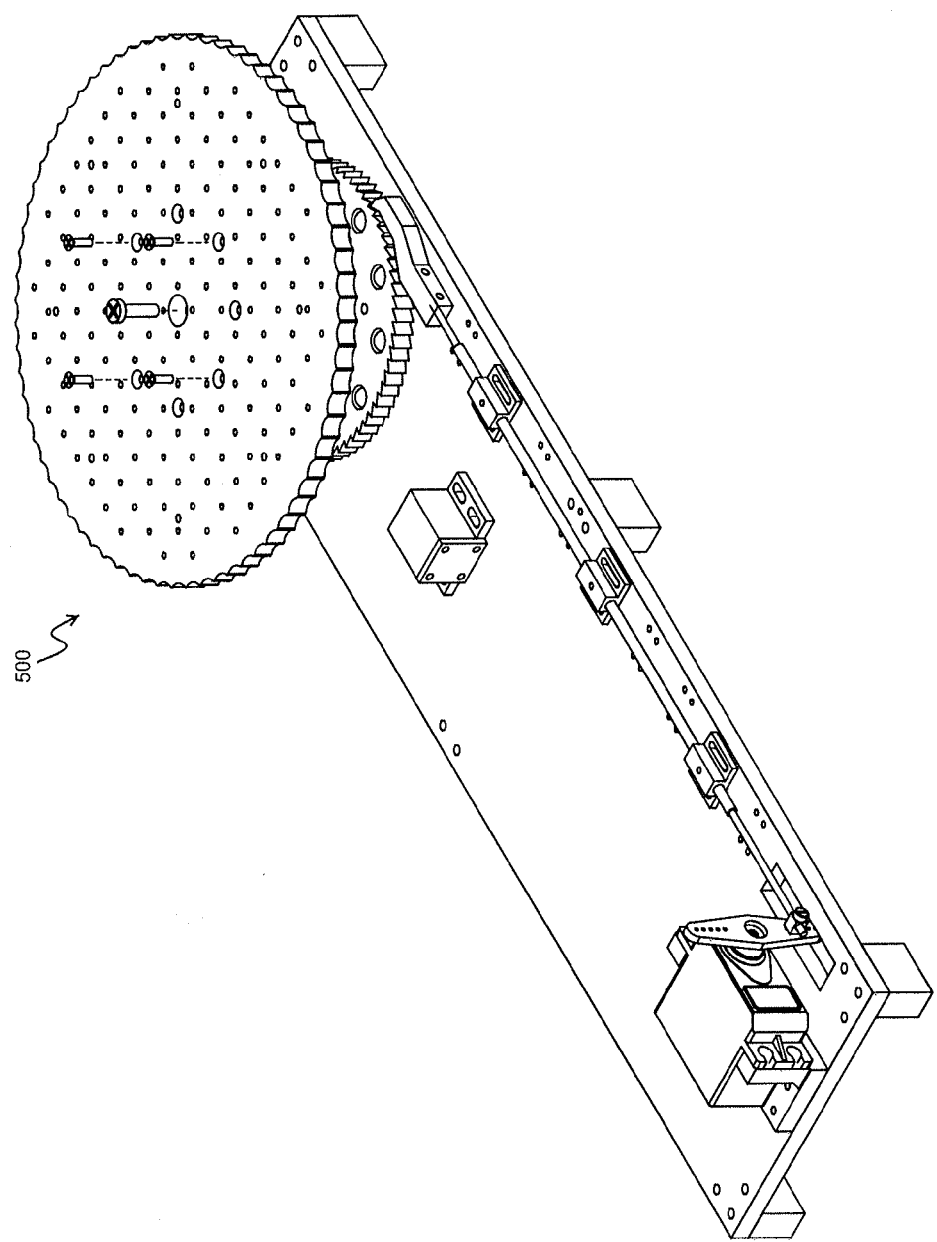
FIG. 5 depicts a sample ratchet table.

Referring to FIG. 5, a ratchet platform (500) may rotate a sensor by any angle desired about a single axis. Because the angle by which the ratchet table rotates is known, corrective data can be collected as specified in earlier sections.

Figure 3:
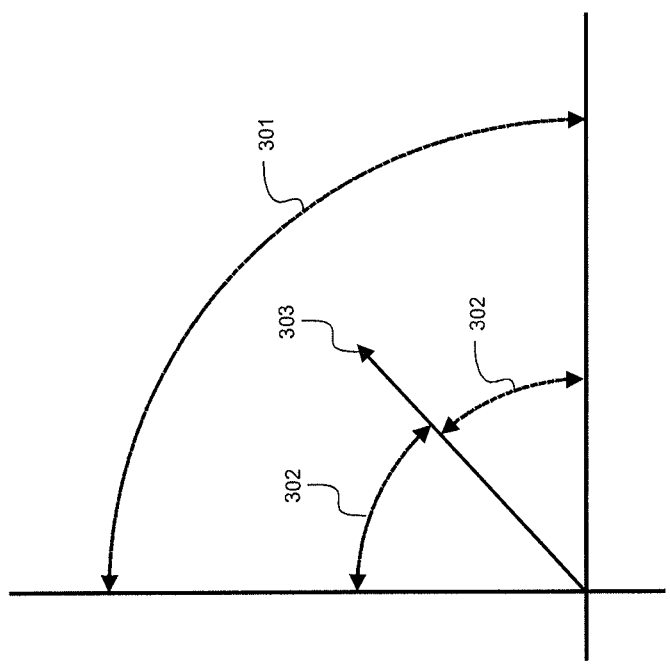
FIG. 3 depicts an exemplary configuration of an angled sensor.

Referring to FIG. 3, a sensor may be placed where a=90 (301). A sensor may be placed in an orientation (303) where it is offset from the 90 degree angles by 45 degrees (302).

A sensor may be placed onto the ratchet table, which then moves the sensor by a fixed angle when activated. Data can then be sampled at each orientation, and correction vectors can be calculated.

Embodiments disclosed herein may include a ratchet table having a ring to which a sensor may be attached. A driving mechanism may drive the ring clockwise or counterclockwise by angle when activated. After the activation of the driving mechanism, a sensor sampler may take several samples of sensed vectors. Calculated vectors may also be computed. Once the data is collected, this data or a subset can be used for direct correction or for filling a lookup table. A ratchet platform allows for fine-tuned error calculations.

2-Axis or 3-Axis Gimbal Calibration

Figure 6:
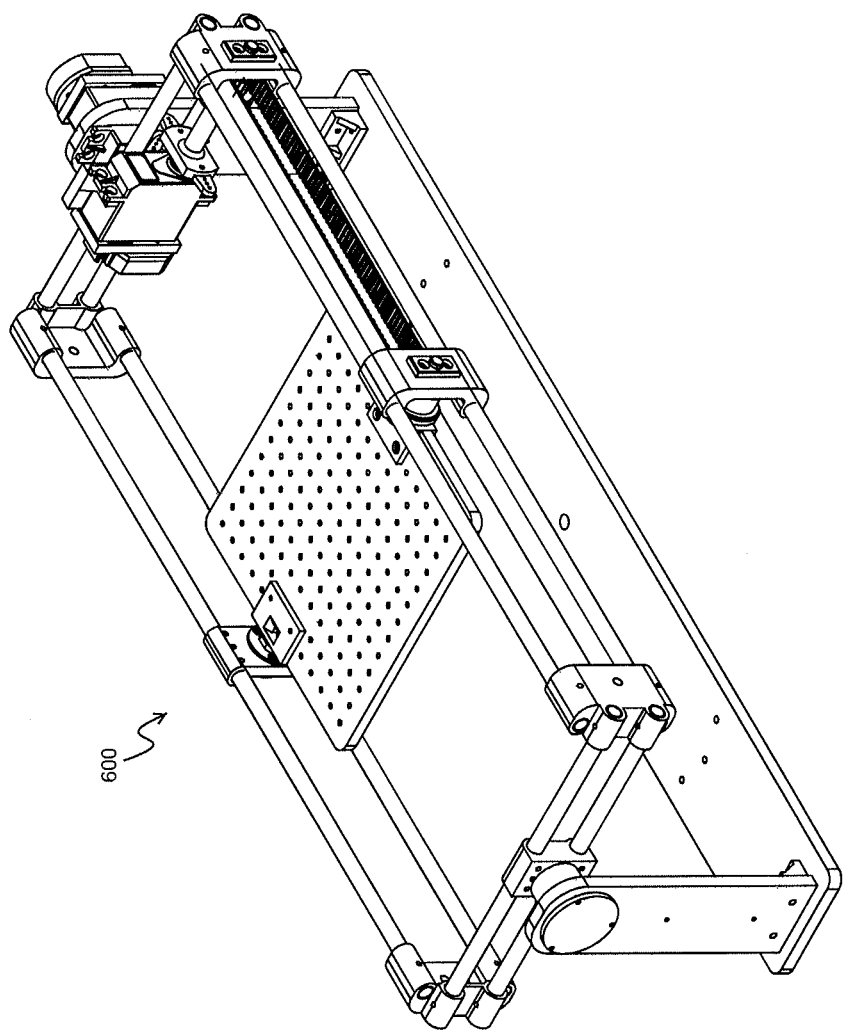
FIG. 6 depicts an exemplary 2-axis gimbal.
Figure 7:
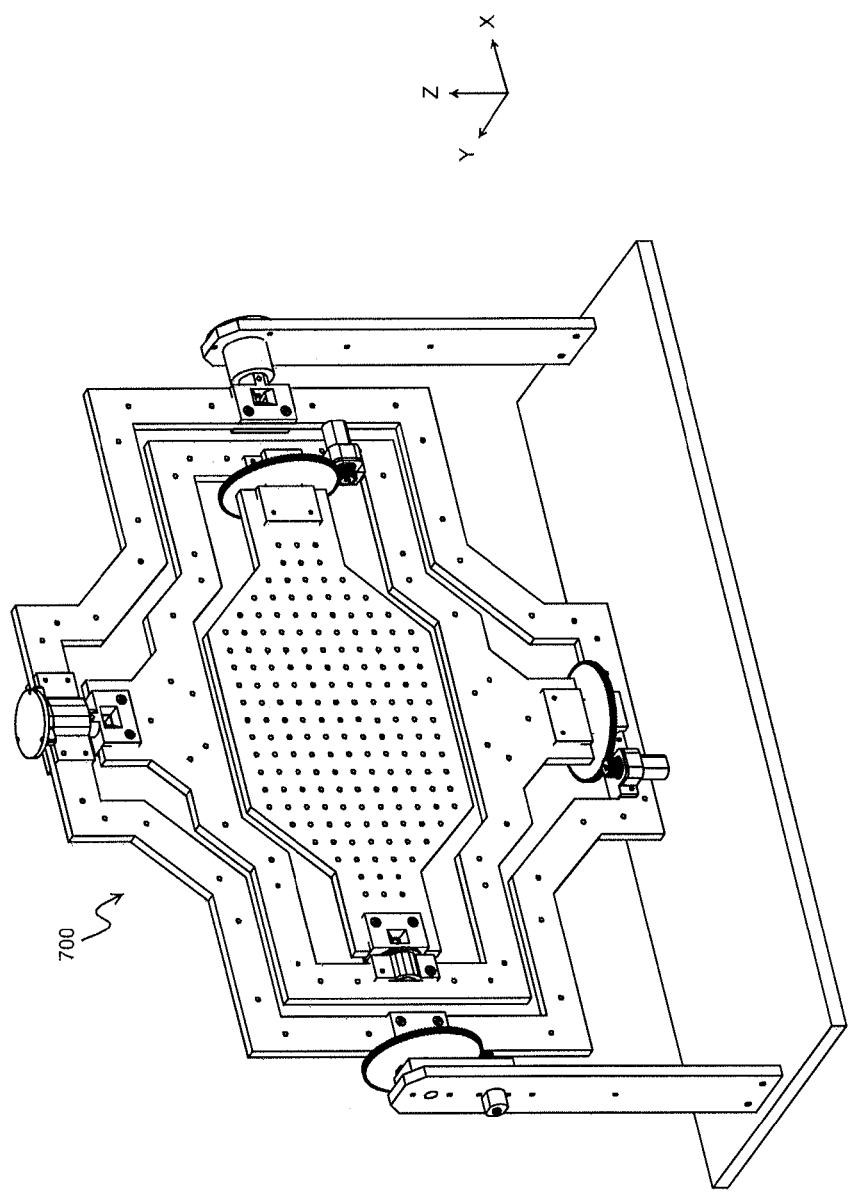
FIG. 7 depicts an exemplary 3-axis gimbal.

A sensor may also be disposed in either a 2-axis or a 3-axis gimbal. Data may be sampled from the sensor as well as recordation of the gimbal's orientation. Using the orientations from the gimbal as "truth data", this data or a subset of it can be used directly or for filling a lookup table. Referring to FIGS. 6-7, exemplary configurations of a 2-axis and 3-axis gimbal device are depicted.

FIG. 6 depicts an exemplary 2-axis gimbal (600). The sensor is placed onto the 2-axis gimbal's central platform, which then can move to a series of 3d orientations (a subset of all possible 3d orientations). Data can then be sampled at each orientation, and correction vectors can be calculated.

FIG. 7 depicts an exemplary 3-axis gimbal (700). A sensor may be placed onto the 3-axis gimbal's central platform, which then can move to a series of 3d orientations. Data can then be sampled at each orientation, and correction vectors can be calculated. The 3-axis gimbal can move to any 3d orientation.

Figure 4:
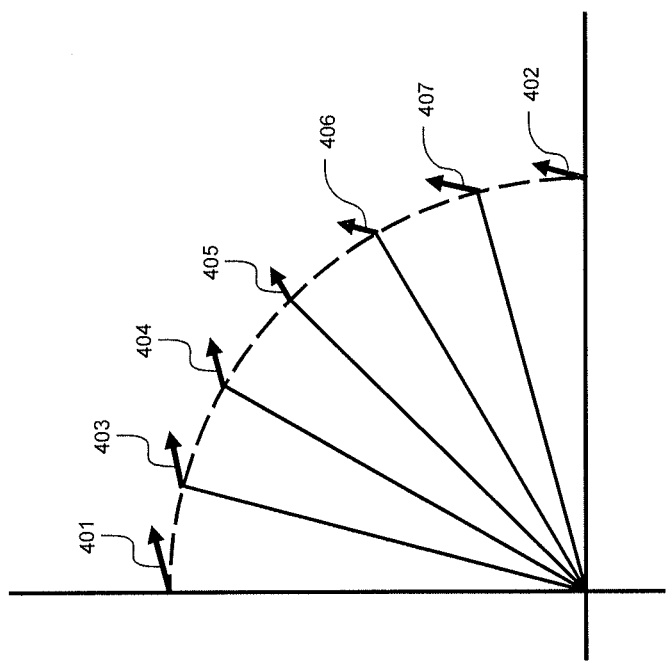
FIG. 4 depicts an exemplary interpolation from 0 degrees to 90 degrees.

In embodiments disclosed herein, a sensor may be placed on platform, which can be rotated by a rotator. By using a set of rotators in concert, it is possible to rotate the sensor to any 3d orientation. Rotation sensors may sense the rotation of the platforms respectively, and report the value of $e_i$ so calculated vectors may be obtained. Once the gimbal is in the desired orientation, a sensor sampler may take several samples of sensed vectors and calculated vectors. Referring to FIG. 4, an example of interpolating correction data to fill a space of higher resolution than the correction data is provided. Correction data for the 90 degree (401) and 0 degree (402) 2d orientations are shown, respectively. Vectors 403, 404, 405, 406, and 407 represent a set of values for correction vectors that may be calculated for the angles in between 0 and 90 degrees given only the data for 0 and 90 degrees. Correction values smoothly slide from a correction value for 0 degrees to a correction value for 90 degrees based on how far it is from either angle.

Application of Correction Vectors to Readings

Once the list of vector corrections has been obtained, they may be interpolated in some way (e.g. angle-based weighting, distance-based weighting, etc.) in order to apply them to sensor readings.

Angle-Based Weighting

This method may calculate a final correction vector for a given vector using a set of vector corrections. It may compare a given vector to each calculated vector using a dot product function, and assigning each calculated vector a weight based on how close it is to the given vector. These weights are then used to take a weighted average of the vector corrections in order to obtain a final correction vector.

Given a vector v, a set of sensed vectors $s_i$ and a set of correction vectors $cv_i$ this may be calculated as follows: For each sensed vector $s_i$ calculate a weight $w_i$ using the formula:

$$w_i = ((v * s_i) + 1)^p$$

where p is used to adjust how closely the final value should be affected by nearby vectors. A larger number will ensure that far away vectors have little effect on the final value (e.g., p=20). It should be understood that other values for p may be utilized.

Sum all the weights $w_i$ into $w_{total}$.

Divide each weight $w_i$ by $w_{total}$ to normalize them.

Calculate the final vector correction $cv_{final}$ by using $cv_{final} = \Sigma cv_i * w_i$.

To apply the final correction vector to a sensed vector, one may add the vector correction onto the sensed vector. Final correction vectors can either be applied to sensed vectors in real-time, or these can be pre-computed and stored in some form of lookup table for use in real-time.

In an example based on the foregoing exemplary methodology, assume input vector v is (0, 1, 0), $s_0$ is (1, 0, 0), $s_1$ is (0, −1, 0), $cv_0$ is (0, 0, 0.5), cv1 is (0.5, 0, 0), and p is 20. Two weights may be calculated for these vectors, as follows:

$$w_0=((v*s_0)+1)^{20}$$

$$w_0=(0+1)^{20}$$

$$w_0=1$$

$$w_1=((v*s_1)+1)^{20}$$

$$w_1=((-1+1)^{20})$$

$$w_1=0$$

Divide all weights by the total weight. This is 1, so no action needs to be taken. This results in a final correction based on the weights:

$$cv_{final}=cv_0*1+cv_1*0=cv_0=(0,0,0.5)$$

Distance-Based Weighting

Another weighting algorithm that can be used in place of the angle-based weighting is a distance-based weighting. Here the calculation of $w_i$ is done by doing the following:

$$w_i=(2-\text{length}(v-s_i))^p$$

This will cause each weight to be based on the Euclidean distance between two vectors. The distance may be subtracted from 2 (maximum distance apart any two unit length vectors can be) so that shorter distances have higher values.

In an example based on the foregoing methodology, assume input vector v is (0, 1, 0), $s_0$ is (1, 0, 0), $s_1$ is (0, −1, 0), $cv_0$ is (0, 0, 0.5), $cv_1$ is (0.5, 0, 0), and p is 20. Two weights may be calculated for these vectors, as follows:

$$w_0=(2-\text{length}(v-s_0))^{20}$$

$$w_0=(2-1.414)^{20}$$

$$w_0=2.28*10^{-5}$$

$$w_1=(2-\text{length}(v-s_1))^{20}$$

$$w_1=((2-2)^{20})$$

$$w_1=0$$

Divide all weights by the total weight: $2.28*10^{-5}$, causing $w_0$ to become 1. Calculate a final correction based on the weights:

$$cv_{final}=cv_0*1+cv_1*0=cv_0=(0,0,0.5)$$

Logical Setup

Figure 8:
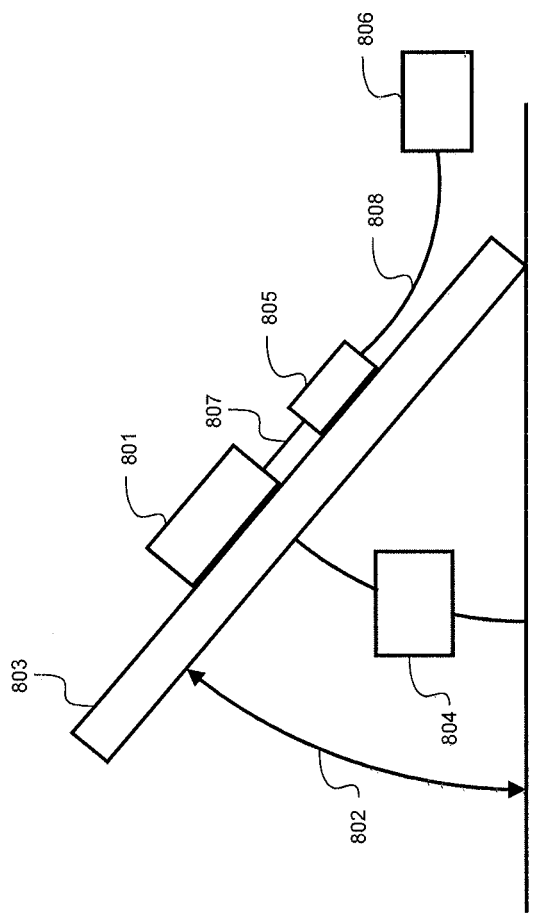
FIG. 8 presents an exemplary workflow.

An exemplary workflow for calibration is shown in FIG. 8. Physical sensor (801) may be moved into a particular orientation (802) by sensor mover (803). Sensor mover (803) may be a ratchet table, a 2 or 3-axis gimbal, an operator's hand, or any number of physical means of rotating an object. Orientation sensor (804) then reports the value of the sensor's orientation (802). Orientation sensor (804) may also rely on pre-coded knowledge of the rotational ability of a given mechanism or a potentiometer which reads the rotation of an axis or any number of physical means of sensing an orientation. Sensor sampler (805) reads a sample of sensed data from physical sensor (801) using communication medium (807), and a sample of calculated data from orientation sensor (804) and the initial sensed vector $s_0$. Sensor sampler (805) may be a computer machine such as a microcontroller with non-volatile memory.

Once the needed data is gathered, it may be applied to later readings from physical sensor (801) by retrieving the data from sensor sampler (805) and using it with a weighting and correction algorithm which may be executed by a Computer Machine configured with instructions to apply the weighting and correction algorithm to the Computer Machine Input (806), which obtains data from the sensor sampler (805) using communication medium (808).

Technical Variations

According to the embodiments described herein, any of the systems, logic and devices can be implemented as machine readable instructions in any programming language of any generation (e.g., 1GL, 2GL, 3GL, 4GL, or 5GL) such as, e.g., machine language that may be directly executed by a Processor, or assembly language, object-oriented programming (OOP), scripting languages, microcode, etc., that may be compiled or assembled into machine readable instructions and stored on a machine readable medium contained in a Computer Machine. Alternatively, such computer-executable instructions may be implemented in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

Embodiments of the present disclosure may include one or more processors.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. The diagrams and representations are all provided for Exemplary purposes. The illustrative diagrams and charts may depict process steps or blocks that may represent modules, segments, or portions of code that include one or more executable instructions for implementing specific logical functions or steps in the process upon a Computer Machine. In various embodiments, described processing steps may be performed in varying order, serially or in parallel. Alternative implementations are possible and may be made by simple design choice or based on, for example, considerations of function, purpose, conformance to standard, legacy structure, user interface design, and the like. Additionally, execution of some functionality, which would be considered within the ambit of one skilled in the art, may or may not be disclosed herein. Finally, variances may be omitted without departing from embodiments disclosed herein.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer Processor executing a program embodied on a non-transitory computer-readable medium to perform functions by operating on Computer Input and generating Computer Output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single Processor or multiple Processors. Additionally, various steps of embodiments may provide one or more data structures generated, produced, received, or otherwise implemented on a computer-readable medium, such as a memory. These capabilities may be performed in the current manner or in a distributed manner and on, or via, any device able to provide and/or receive information. Still further, although depicted in a particular manner, a greater or lesser number of modules and connections can be utilized with the present disclosure in order to implement or perform the various embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A sensor calibration system comprising:
   a vector-value sensor disposed in a single housing;
   a special-purpose computer machine configured to automatically calculate a set of vector corrections in response to receiving, as computer input, a set of sensed vectors from said vector-value sensor wherein said computer machine is further configured to calculate a final correction vector and apply said final correction vector to a live sensor reading by:
   in response to placing said vector-value sensor in a prime orientation:
      recording, in a computer memory, a prime sensed vector;
   in response to rotating said vector-value sensor a first known angle away from said prime orientation:
      recording, in said computer memory, a first sensed vector;
   in response to rotating said vector-value sensor a second known angle away from said prime orientation:
      recording, in said computer memory, a second sensed vector;
   in response to rotating said vector-value sensor through "n" known angles away from said prime orientation:
      recording, in said computer memory, through "n" sensed vector(s);
   calculating a set of calculated vectors by:
      calculating a first calculated vector by rotating the prime sensed vector obtained from the vector-value sensor by said first known angle away from said prime orientation;
      calculating a second calculated vector by rotating the prime sensed vector obtained from the vector-value sensor by said second known angle away from said prime orientation;
      calculating through "n" calculated vector(s) by rotating the prime sensed vector obtained from the vector-value sensor by each of said "n" known angle(s) away from said prime orientation;
   calculating a set of first, second, through "n" vector corrections ($cv_i$) by subtracting:
      said first sensed vector from said first calculated vector;
      said second sensed vector from said second calculated vector;
      each of said "n" sensed vectors from each of said "n" calculated vector(s); and
   calculating said final correction vector, for an input vector from said vector-valued sensor, using said set of vector corrections; and
   storing said final correction vector in said computer memory;
   recording a live sensor reading provided by said vector-value sensor; and
   applying said final correction vector to said live sensor reading.

2. A sensor calibration system as claimed in claim 1 wherein said final correction vector is calculated by further weighting an average of said set of first, second, through "n" vector corrections wherein a proximity value more heavily weights vectors more proximate to said input vector than less proximate vectors.

3. A sensor calibration system as claimed in claim 2 wherein for each sensed vector ($s_i$) a weight ($w_i$) is calculated using the formula: $w_i=((v*s_i)+1)^p$ and further wherein v represents said input vector and p adjusts how closely said final correction vector should be affected by a set of nearby vectors.

4. A sensor calibration system as claimed in claim 3 wherein p equals 20.

5. A sensor calibration system as claimed in claim 3 wherein:
   each of said weights ($w_i$) is summed into $weight_{total}$;
   each of said weights ($w_i$) is divided by $weight_{total}$; and
   said final correction vector ($cv_{final}$) is calculated using a $cv_{final}$ formula comprising $cv_{final}=\Sigma cv_i*w_i$.

6. A sensor calibration system as claimed in claim 5 wherein said computer machine calculates said final corrected vector using a set of interpolated vector corrections from a computer memory.

7. A sensor calibration system as claimed in claim 2 wherein said weighted average of said set of first, second, through "n" vector corrections is performed using a distance-based weighting formula.

8. A sensor calibration system as claimed in claim 1 further comprising a ratchet platform which rotates said vector-value sensor.

9. A sensor calibration system as claimed in claim 1 further comprising a 3-axis gimbal which samples and records data from said vector-value sensor and said gimbal's orientation.

10. A sensor calibration system as claimed in claim 1 wherein each of said known angles divides into 360 evenly.

11. A sensor calibration system as claimed in claim 1 further comprising a bracket, wherein, for each rotation of said vector-value sensor, said vector-value sensor is placed in said bracket designed to provide consistent angle rotation.

12. A sensor calibration system as claimed in claim 1 wherein said vector-value sensor comprises six faces and said final correction vector for said input vector is calculated by:
   recording said set of sensed vectors for each of said six faces wherein each of said sensed vectors is recorded in response to rotating said vector-value sensor about each of said six faces' normal and further wherein each of said six faces are similarly situated for gathering said set of sensed vectors; and
   calculating said set of calculated vectors for each of said six faces; and
   calculating said final correction vector for a given vector by calculating a weighted average of said set of first, second, through "n" vector corrections for each of said six faces wherein a proximity value weights more proximate vectors more heavily than less proximate vectors.

13. A sensor calibration system as claimed in claim 12 wherein a plurality of final correction vectors are interpolated from a plurality of angles and wherein said computer machine accesses said computer memory to retrieve a final correction vector in response to receiving as computer input said input vector from said vector-value sensor.

14. A sensor calibration system comprising:
a vector-value sensor selected from the group consisting of a magnetometer and a accelerometer;
a special purpose computer machine configured to automatically calculate a final correction vector for an input vector and apply said final correction vector to a live sensor reading by:
in response to placing said vector-value sensor in a prime orientation, recording a prime sensed vector;
in response to rotating said vector-value sensor a first known angle away from said prime orientation, recording, in computer memory, a first sensed vector;
in response to rotating said vector-value sensor a second known angle away from said prime orientation, recording, in computer memory, a second sensed vector;
in response to rotating said vector-value sensor through "n" known angle(s) away from said prime orientation, recording, in computer memory, through an "n" sensed vector;
calculating a set of calculated vectors by:
calculating a first calculated vector by rotating the prime sensed vector obtained from the vector-value sensor by said first known angle away from said prime orientation;
calculating a second calculated vector by rotating the prime sensed vector obtained from the vector-value sensor by said second known angle away from said prime orientation;
calculating through "n" calculated vector(s) by rotating the prime sensed vector obtained from the vector-value sensor by each of said "n" known angle(s) away from said prime orientation;
calculating a set of first, second through "n" vector corrections ($cv_i$) by subtracting each of said first, second through "n" sensed vectors from each of said calculated vectors where said sensed vectors and said calculated vectors share said known angle;
calculating said final correction vector for said input vector by
taking a weighted average of said set of first, second, through "n" vector corrections wherein a proximity value (p) weights more proximate vectors more heavily than less proximate vectors,
for each sensed vector ($s_i$) a weight ($w_i$) is calculated in relation to said input vector (v) using the formula: $w_i=((v*s_i)+1)^p$,
each of said weights calculated is summed into $weight_{total}$; each of said weights ($w_i$) is divided by $weight_{total}$; and said final correction vector ($cv_{final}$) is calculated by a $cv_{final}$ formula comprising: $cv_{final}=\Sigma cv_i*w_i$; and
storing said final correction vector in computer memory:
recording a live sensor reading provided by said vector-value sensor; and
applying said final correction vector to said live sensor reading.

15. A sensor calibration system as claimed in claim 14 wherein said computer machine interpolates a set of final correction vectors for a plurality of input.

16. A sensor correction system comprising a computer machine further comprising computer-executable instructions to:
receive an input vector reading from a vector-value sensor;
access a computer memory comprising a set of interpolated final correction vectors for a plurality of vector readings, wherein:
said set of interpolated final correction vectors are determined from:
a set of sensed vectors obtained from the vector-value sensor in response to rotating said vector-value sensor through at least "n" known angles; and
a set of calculated vectors in response to rotating a prime sensed vector obtained from the vector-value sensor through said "n" known angles away from a prime orientation, wherein said sensed vectors and said calculated vectors are subtracted from one another, weighted, and normalized, wherein a given final correction vector is calculated using a $cv_{final}$ formula comprising: $cv_{final}=\Sigma cv_i*w_i$ wherein $cv_{final}$ is said final correction vector, $cv_i$ represents a correction vector associated with each angle rotation, and $w_i$ represents a normalized weight factor;
select an applicable final correction vector;
return said final correction vector as computer machine output;
receive a live sensor reading from said vector-value sensor; and
apply said vector-value sensor to said live sensor reading.

17. A sensor correction system as claimed in claim 16 wherein a proximity value weights more proximate vectors more heavily than less proximate vectors.

* * * * *